UNITED STATES PATENT OFFICE.

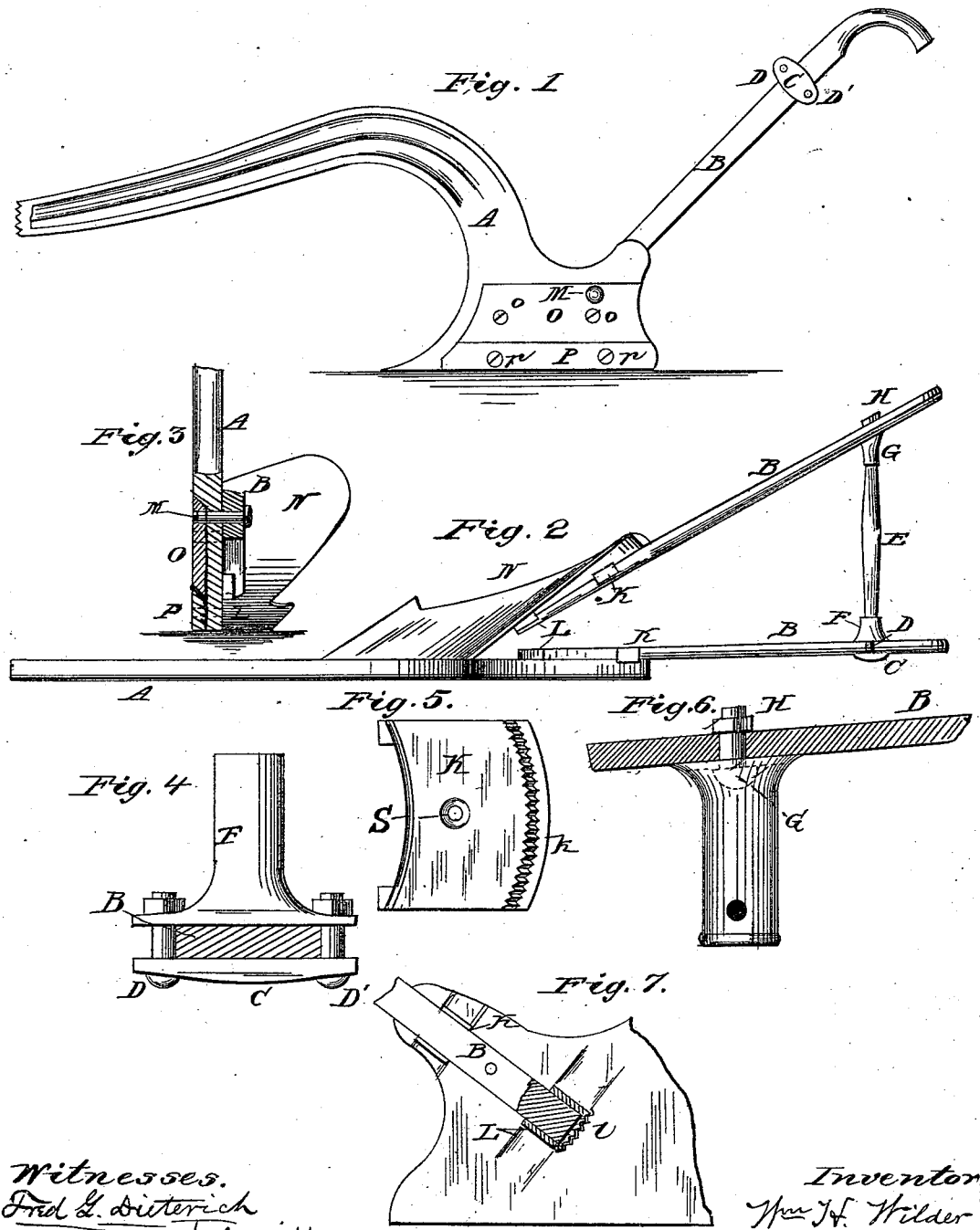

WILLIAM H. WILDER, OF WATERPORT, NEW YORK.

IMPROVEMENT IN PLOWS.

Specification forming part of Letters Patent No. 211,822, dated January 28, 1879; application filed April 17, 1878.

*To all whom it may concern:*

Be it known that I, WILLIAM H. WILDER, of Waterport, in the county of Orleans and State of New York, have invented certain new and useful Improvements in Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 represents a land-side view of a plow with my improvements thereon. Fig. 2 is a top view of the same. Figs. 3, 4, 5, 6, and 7 are detached views, which will be hereinafter explained.

My invention consists, first, in an improved mode of attaching the plow-handles to the mold-board and land-side; secondly, in the mode of fastening the rounds to the handles; and, thirdly, in a sectional land-side.

In Fig. 1, A represents the cast-iron beam and land-side, and B is one of the handles, with the round attached thereto by means of a socket, F, cap C, and two bolts, D D', placed at the sides of the handle, and connecting said socket and cap, thus avoiding the necessity of boring and weakening the handle. The round E, Fig. 2, is driven into the socket F, which is fitted to the inside of the handle, and held in place by the bolts D D'. The other end of the round E is provided with a modified form of socket, (better shown in Fig. 6, where a small bolt, G, is shown in dotted lines with its head in the socket, and nut H on the bolt,) thus securely holding the handle B, while the small hole bored for the bolt G does not weaken the handle. Therefore these sockets (shown in Figs. 4 and 6,) are a great improvement over the usual method of boring the handles and putting in very large rounds, thus cutting, straining, and weakening the handles, which in heavy plows require to be very strong.

The lower ends of the handles are provided with sockets L, having three lips, which embrace the ends of the handles. The lower ends of these sockets have notches or corrugations *l*, Fig. 7, which fit into corresponding notches on the land-side, and also on the mold-board, for the purpose of adjusting the ends of the handles. At considerable distance above these sockets the handles are provided with and fitted into lugs K, Fig. 5, which have only two lips, embracing the sides of the handle and also notches *k*, Fig. 5, which gear into corresponding notches on the land-side and on the mold-board. Then the handles are fastened by means of a bolt passing through holes S in the lugs K, Fig. 3. These lugs K and S are better shown in Figs. 5 and 7.

On the land-side of my plow I use two sectional plates, O and P, Figs. 1 and 3, which may be easily replaced when worn. These plates are simply facing-plates bolted to the land-side A, and intended for wear, while main plate A gives the strength and carries the face-plates or wearing-plates. By this construction no wear comes on the beam, or on that part of the land-side cast in the same piece with the beam. By the use of these plates I can repair a plow for the trifling expense of half a dollar. The plates are fastened in place by means of nut-bolts *o* and *p*.

I do not broadly claim the adjustability of the handles or the use of serrated plates, but limit my claims to my devices therefor, having lips for embracing and strengthening the handles, in combination with and acting in connection with the land-side and mold-board; and I do not broadly claim a wearing-plate on the land-side, but limit my claim in this respect to the secondary plate above the face-plate and in connection therewith.

Having described my invention, I claim—

1. The round-sockets having end holes for the bolts G, in combination with the handles B and round E, substantially as set forth.

2. The sockets L, having lips to embrace and strengthen the handles, and also provided with notches *l*, and the lugs K, having lips to embrace and strengthen the handles, and also provided with notches, in combination with the land-side and mold-board having notches, substantially as and for the purposes set forth.

3. In a plow having a land-side plate, A, cast with the beam, (in one piece,) and extending to the bottom of the plow, the two face-plates M and P, substantially in the manner and for the purposes set forth.

In testimony that I claim the foregoing as my own I affix my signature in presence of two witnesses.

WILLIAM H. WILDER.

Witnesses:
 C. F. CURTISS,
 P. D. ANDERSON.